March 25, 1930. W. H. REES 1,751,760
WEIGHING MACHINE
Filed Jan. 3, 1923  5 Sheets-Sheet 1

FIG.1.

INVENTOR.
William H. Rees
BY White Prost + Evans
ATTORNEYS.

WITNESS:

March 25, 1930.    W. H. REES    1,751,760
WEIGHING MACHINE
Filed Jan. 3, 1923    5 Sheets-Sheet 2

INVENTOR.
William H. Rees.
BY White Prost & Evans
ATTORNEYS.

March 25, 1930. W. H. REES 1,751,760
WEIGHING MACHINE
Filed Jan. 3, 1923   5 Sheets-Sheet 3

INVENTOR.
William H. Rees.
BY White Prost + Evans
ATTORNEYS.

WITNESS.

March 25, 1930.   W. H. REES   1,751,760
WEIGHING MACHINE
Filed Jan. 3, 1923   5 Sheets-Sheet 4

INVENTOR.
William H. Rees.
BY White Prost & Evans
ATTORNEYS.

WITNESS:
Bernard H. Boolin

March 25, 1930.  W. H. REES  1,751,760
WEIGHING MACHINE
Filed Jan. 3, 1923   5 Sheets-Sheet 5

INVENTOR.
William H. Rees.
BY White Prost & Evans
ATTORNEYS.

WITNESS.

Patented Mar. 25, 1930

1,751,760

UNITED STATES PATENT OFFICE

WILLIAM H. REES, OF BERKELEY, CALIFORNIA

WEIGHING MACHINE

Application filed January 3, 1923. Serial No. 610,456.

My invention relates to weighing machines and especially to that class of weighing machines which are capable of delivering successive predetermined loads into receptacles.

One of the objects of the invention is the provision of a weighing machine in which predetermined unit loads of material are automatically weighed out and delivered into suitable receptacles.

Another object of the invention is the provision of an apparatus of the character described in which the pointer or other moving parts affected by the weight on the machine, is uninfluenced by any frictional resistance other than that inherently residing in the weighing mechanism; and in which the initiation of each stage or phase of the complete cycle of operations is the result of a spark discharged between two electrodes, the gap between which is varied by the movement of certain of the scale parts which are affected by the weight on the scale.

Another object of the invention is the provision of a weighing machine of the character described in which the gate, controlling the flow of material to the machine hopper, closes in a two-stage movement, the first stage resulting in interrupting the flow of the main volume of material, and the second stage cutting off the dribble flow so that unusual accuracy in the weighing of each unit load results.

My invention possesses other objects and features of advantage, some of which with the foregoing will be set forth in the following description of the invention. It is to be understood that I do not limit myself to the showing made by the said description, as I may adopt variant forms of the invention within the scope of the claims.

Referring to the drawings.

In terms of broad inclusion, my invention comprises a conveyor for feeding material to be handled, across a gated aperture, thru which the material falls into a suitable receptacle arranged upon the platform of a weighing scale. Accession of the load on the scale moves an element which for convenience may be the pointer, working over the face of the dial, to vary a gap in an electrical circuit so that at a predetermined point, corresponding to a few pounds less than the desired unit load of material, a spark is discharged across the gap. For purposes of explanation such unit load may be assumed to be 100 pounds. The discharge of the spark, which occurs when a load of 98 pounds, for example, has accumulated on the scale, varies the electrical characteristics of certain related circuits, and effects the operation of electrical devices, which permit the partial closing of the gate to interrupt the main stream of material flowing therepast. The partial closing of the gate still permits a dribble of material to flow onto the scale, and, as this dribble flow completes the unit load of 100 pounds, the production of a second spark initiates the operation of other electrical devices to permit the complete closing of the gate and the shutting off of further flow of material to the scale. Preferably, the material is first deposited in a hopper, and, upon the closing of the gate, mechanism is set in motion for feeding the material from the hopper to a suitable receptacle, vibrating the receptacle to permit the packing of the material therein. Means are also provided for preventing the transmission of the vibration from the hopper and receptacle to the scale mechanism, and for automatically returning the parts to first position so that upon the manual opening of the gate, the cycle of operation is repeated, resulting in a second predetermined load being deposited in a second receptacle, with return of the parts to first position.

A detailed description of my weighing machine follows:

Arranged on the platform 2, of the weighing scale 3, is a frame work 4 in which a hopper 6 is rigidly supported, closely adjacent to channels 7, rigidly fixed on any suitable supporting means. Extending upwardly on the outside of each of the beams 7 from the frame 4 are arms 8 in engagement with a cam 9, on a disk 11, pivotally mounted on each beam 7. Rotation of the disk 11 at a suitable moment in the operation of the machine results in suspending the frame 4 and the load of material therein from the arms 8 thus taking the weight off of the scale platform and preventing the transmission of vibration to the delicate scale mechanism.

The lower end of the hopper 6 is surrounded by a sack-holding mechanism 12, about which the mouth of the sack 13 is held by manipulation of the levers 14 in a manner which is well known. Journaled in the upper portion of the frame 4 is a shaft 15 having eccentrics 16 and 17 arranged thereon. Rods 18 and 19 connect the eccentrics 16 and 17 respectively with opposite sides of the sack-holding device 12 so that rotation of the shaft vibrates the sack holder up and down to assist in the packing of the material in the sack. A large button 20 on which the bottom of the sack rests assists in the result. A long coil spring 21 connecting the frame 4 with the crank pin of disk 22, fixed on the shaft 15, effects the return of the eccentric after rotation of the shaft to bottom center position with the sack holder 12 in its lowermost position.

Figure 1:
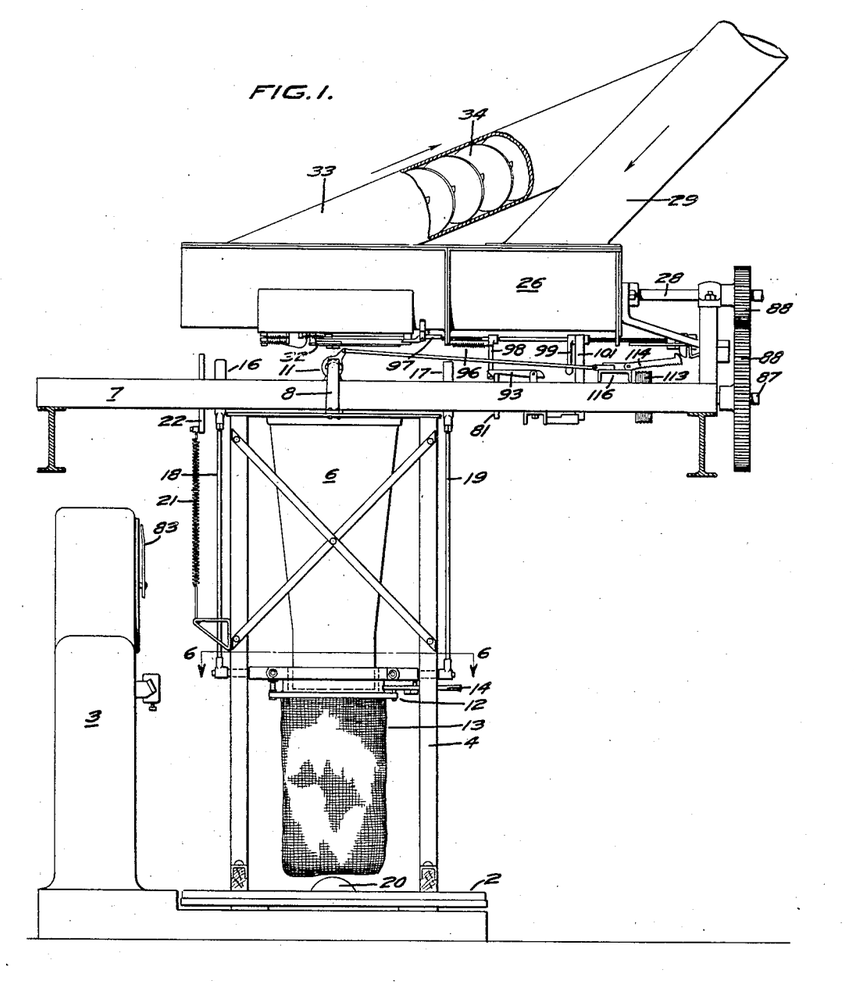
Fig. 1 is a side elevation of my weighing machine.

Arranged above the frame work 7, is a feed conduit 26, in which is a feed screw 27, arranged on the shaft 28, turned by any suitable source of power. Material enters the feed conduit thru the conduit 29, is caught by the feed screw and conveyed toward the opposite end (left of Fig. 1 and Fig. 2) across an aperture 31, adapted to be closed by the gate 32, pivotally mounted on the under side of the conduit. Material which is fed past the gated aperture does not clog or jam in the end of the conduit, but is discharged into a conduit 33 in which a screw 34 conveys the material back to the point of origin.

The gate 32 is carried upon the bar 36 provided at its end with a roller 37 bearing upon an arcuate guide 38, fixed on the bottom of the feed conduit 26. The bar 36 is also provided with a lug 39 adapted to engage with latches 41 and 42 pivoted on the under side of conduit 26, and so arranged as to hold the gate in the fully opened position, shown in Fig. 3, or in the partially closed position indicated by the dotted lines 43 of Fig. 3. A spring 44 tends to close the gate and springs 46 and 47 resiliently hold the latches 41 and 42 respectively against the lug 39. Each of the latches 41 and 42 is provided with a portion forming an armature, and electromagnets 48 and 49 are arranged on the under side of the conduit 26 to control the release of the latches 41 and 42 respectively. A pull rope 51, extending from the gate bar 36 to a point convenient to the operator, provides means for manually opening the gate against resistance of the spring 44, until it is caught and held by the latch 41 in the wide open position.

Means are provided for closing the gate in a two-stage movement when the desired quantity of material has been fed into the hopper. The gate first closes partially to shut off the main flow of material a few pounds before the desired maximum load has been fed upon the scale, and then when the dribble thru the restricted aperture has gradually brought the load up to the desired maximum the gate closes completely.

Figures 8, 9:
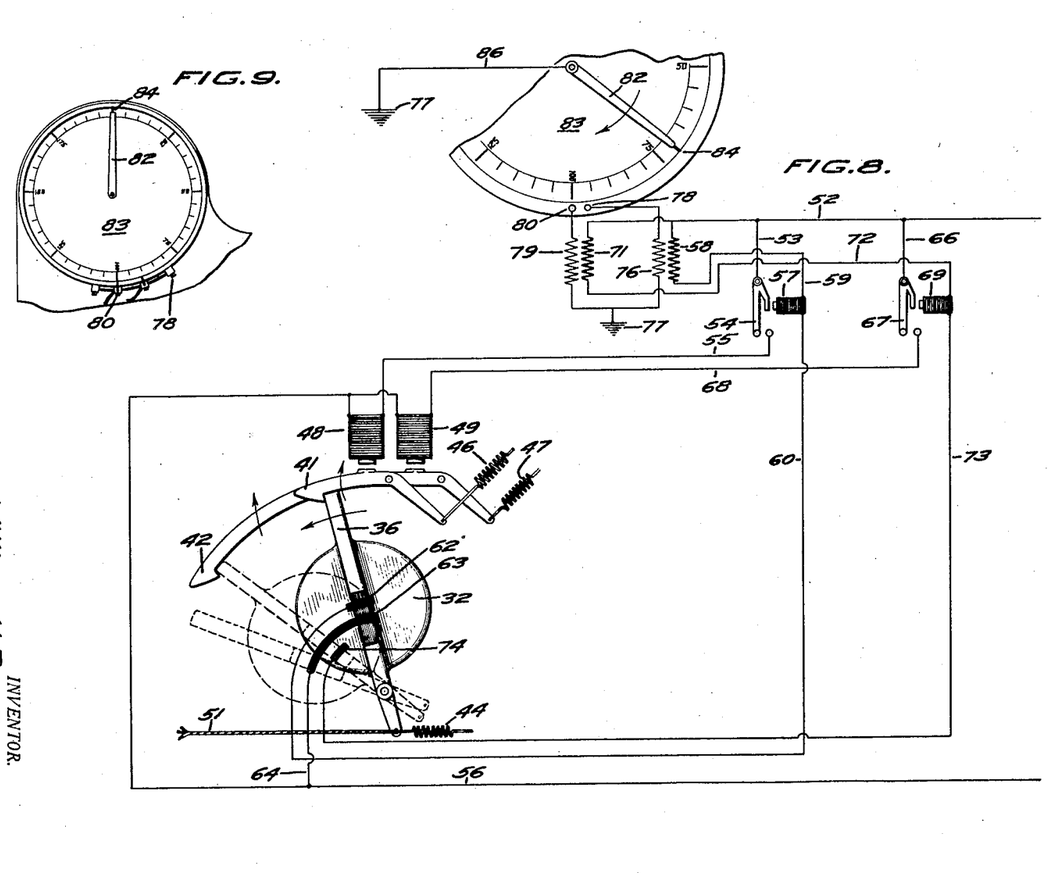
Fig. 8 is a diagrammatical view of the gate closing mechanism and the control circuits therefor.
Fig. 9 is a front elevation of the scale dial showing the fixed and movable electrodes.

Referring now principally to Fig. 8, the electromagnet or translating device 48, for controlling the latch 41, is included in a circuit comprising the line 52, conductor 53, the switch 54, the conductor 55 and line 56. The switch 54 is controlled by a translating device or electromagnet 57, which is in a circuit comprising the line 52, primary coil 58, and conductors 59 and 60, the latter of which terminates in a contact finger 62 which is connected by the bar 36 of the gate, when the gate is in the open position, with the contact finger 63 connected by conductor 64 with the line 56. In a similar way, the electromagnet 49 is included in a circuit formed by the line 52, conductor 66, the switch arm 67, conductor 68 and line 56; the switch 67 being controlled by the electromagnet 69 which is in a circuit comprising the line 52, primary coil 71, conductors 72 and 73, the latter of which terminates in a contact finger 74, which is connected by the bar 36, when the gate is in the partially closed position, with the contact finger 63, and thru the conductor 64 to the line 56.

Inductively coupled with the primary coil 58, is a secondary coil 76, connected to the ground 77 on one side, and to an adjustably positioned stud comprising an electrode 78 on the other side. Inductively coupled to the primary coil 71, is a secondary coil 79, terminating on one side in the ground 77 and on the other in an adjustably positioned stud or electrode 80. The pointer 82 moving about the scale dial 83, in response to the load on the platform of the scale, is provided at its outer end with an electrode 84 and is connected by a suitable conductor 86 with the ground 77. The fixed electrodes 80 and 78 are so arranged that the movable electrode 84 will miss them by a small gap and the proportions between the primary and secondary coils are such that with a voltage of 110 in the primary circuit, a current of 2000 volts will be induced in the secondary circuit.

If the desired unit load of material to be placed in each sack is 100 pounds then the electrode 78 will preferably be placed at about 98 pounds on the dial, and when under the influence of the weight of material in the hopper 6, the pointer 82 is displaced about the dial 83 until it reaches a point substantially radially adjacent the electrode 78, a spark is discharged across the two electrodes causing a momentary surge of current thru the primary coil 58 sufficient to energize the electromagnet 57, thus actuating the switch 54 so that the electrode 48 is energized. This results in pulling back the latch 41 and permitting the gate to move thru the first stage of its closing movement, the gate being caught by the latch 42 in the partially opened position in which a dribble of material may still pass thru to bring the load up to the desired maximum. As the gate moves thru the first stage of its movement the connection between the contact fingers 62 and 63 is broken thus breaking the circuit thru the magnet 57 and permitting the switch 54 to open. As the dribble thru the partially opened feed aperture gradually brings the load up to the desired maximum the pointer 82 reaches a position radially opposite the electrode 80 which is positioned at 100 on the dial. Another spark is then discharged across the gap resulting in a similar surge in the primary coil 71, actuating the magnet 69 to close the switch 67, which results in the energization of the magnet 49 which then releases the latch 42 permitting the gate to close completely. As the gate moves to its final closed position the connection between the contact fingers 63 and 74 is broken, thus breaking the circuit thru the magnet 69 and permitting the switch 67 to open.

When the gate is either in the open or partially open position, a small amount of current is normally flowing thru the primaries 58 or 71, as the case may be, but due to the impedance of these coils the current is insufficient to energize the electromagnets. The discharge of the spark across the gap initiates the cycle of operation which then automatically proceeds to a point at which all circuits and mechanisms are restored to first condition.

Means are provided for feeding the accumulated load in the hopper into the sack, vibrating the sack to help pack the load, for preventing the transmission of the vibration to the delicate portions of the scale mechanism, and for returning the parts to first position, all activated by the closing of the gate.

Journaled in bearings arranged on the frame members 7 is a shaft 87 in alinement with the shaft 15 and driven from the shaft 28 by the spur gears 88. Fixed on the end of the shaft 15 is a clutch member 89, and on the end of the shaft 87 a complementary clutch member 81 is adapted to be pressed into engagement with the clutch member 89 by the spring 92. A pivoted latch 93 is arranged to engage the flanged end of the clutch member 91 to hold it out of engagement with the clutch member 89. Slidably mounted in bearings arranged on the under side of the conduit 26, is a rod 94, held in its right-hand extreme position, as viewed in Fig. 2, against the pull of the spring 96 by the trigger 97 which is so arranged as to be released by the closing gate. The rod 94 is provided with a fixed arm 98 for retracting the clutch member 91, and a fixed arm 99 for releasing the latch 93. Pivotally mounted on the rod 94 is also a feed arm 101 provided at its lower end with segmental threads adapted to be engaged with the feed screw 102 which is fixed on the shaft 87. The engagement of the feed arm with the feed screw is determined by the guides 103 and 104. A split collar 106 having a stud thereon is adjustably positioned on the end of the feed screw to insure the disengagement of the feed arm at the proper time.

Figure 2:
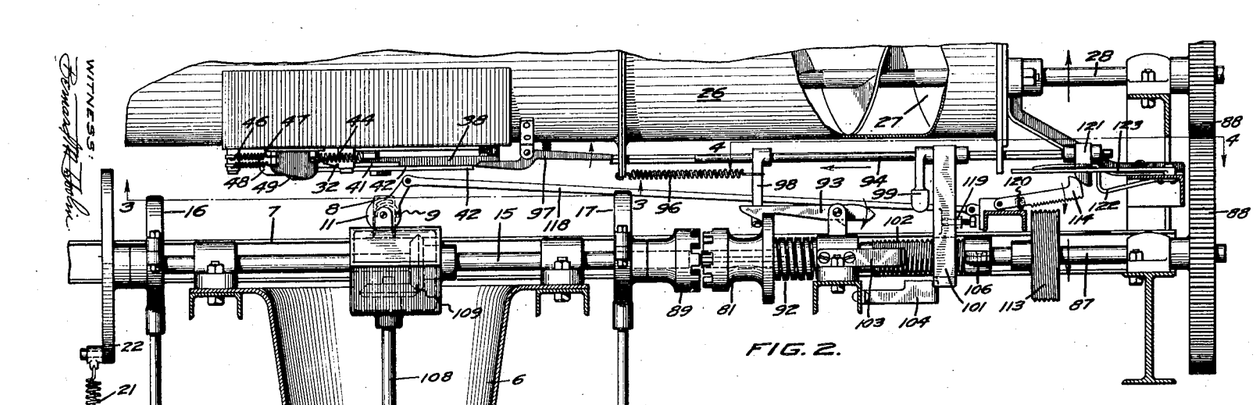
Fig. 2 is a side elevation partly in section of that portion of the machine embodying the main operative elements.
Figure 3:
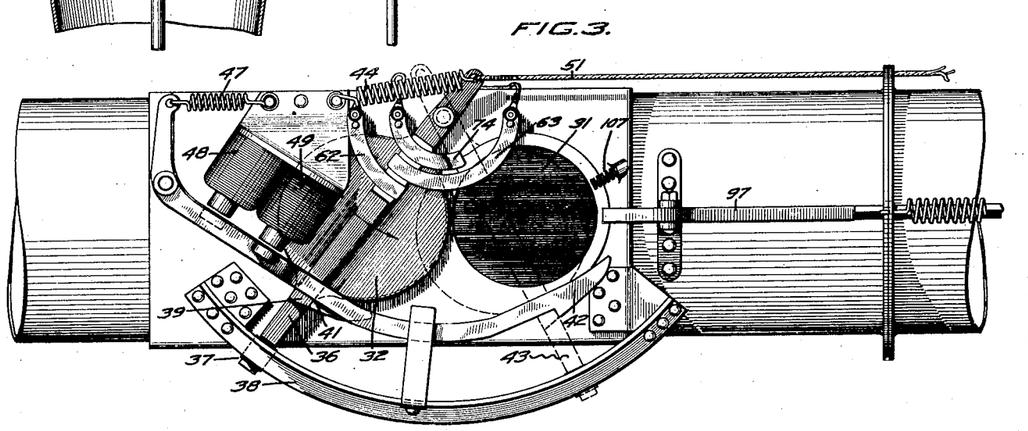
Fig. 3 is a bottom view of a portion of the mechanism the plane of projection being indicated by the line 3—3 of Fig. 2.

When the gate 22 swings to its closed position, the trigger 97 is released, a spring 107, Fig. 3, being provided to cause a slight rebound of the gate so that the trigger may fall to proper engagement with the rod 94 on the completion of the cycle of movement. With movement of the trigger 97 the spring 96 pulls the rod 94 to the left, as seen in Fig. 2, the arm 99 releasing the latch 93 and permitting the clutch members 81 and 89 to engage thus causing rotation of the shaft 15. At the end of this movement the feed arm 101 has been forced into engagement with the threads of the feed screw by the guide 103, and since the feed screw is appropriately threaded to move the feed arm to the right, the rod 94 immediately starts its return journey to first position, continuing until the arm 98 has moved the clutch member 81 out of engagement with its complementary clutch member into engagement with the latch 93, and the trigger 97 has dropped behind the end of the rod. At this time the feed arm 101 is released from the guide 104 and either disengages from the threads by reason of the stress between the threads themselves, or is thrown out of engagement by the stud on the collar 106. Immediately upon the release of the feed arm 101 the spring 96 jerks the rod back a trifle so that the lower end of the feed arm is on the outside of the guide 104, as shown in Fig. 2, and in the position to begin a second cycle.

As explained in the earler portion of this description, rotation of the shaft 15 effects the vibration of the sack holder. Means are also provided, operated by the shaft 15, for discharging the material from the hopper to the sack. Journaled axially in the hopper is a shaft 108 driven from the shaft 15 by suitable bevel gears 109. The lower end of the shaft 108 is provided with a slotted disk 111 formed with diametrically opposite depending lips 112, which extend under the slots in a direction opposite to that of the rotation of the disk and on the under side thereof. When the material is fed into the hopper the disk is stationary and because of the extending lip, relatively little of the material passes thru the slots into the sack. Upon rotation of the disk, however, with a load of material resting thereon, the material is fed thru the slots and evenly distributed into the sack below.

Figure 4:
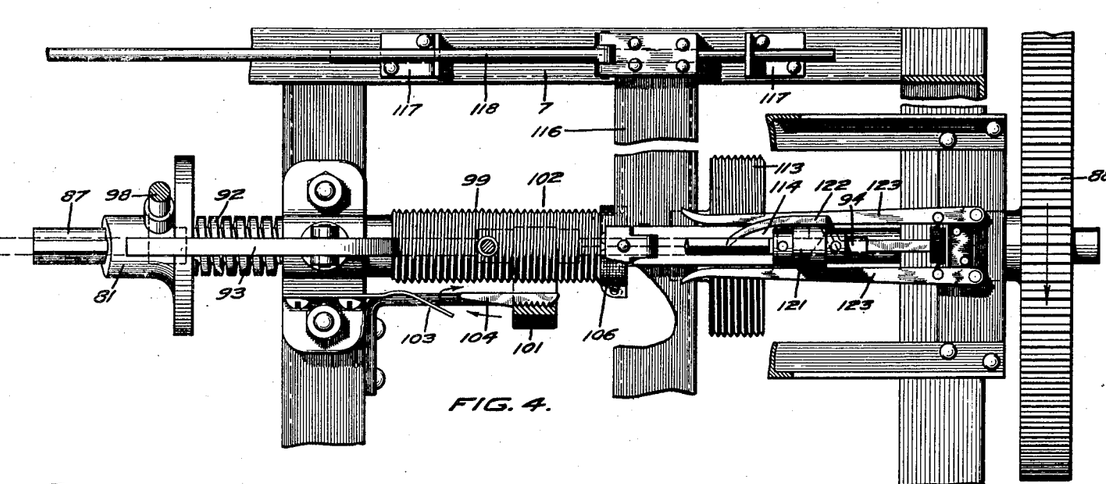
Fig. 4 is a top view of a portion of the mechanism the plane of projection being indicated by the line 4—4 of Fig. 2.
Figure 5:
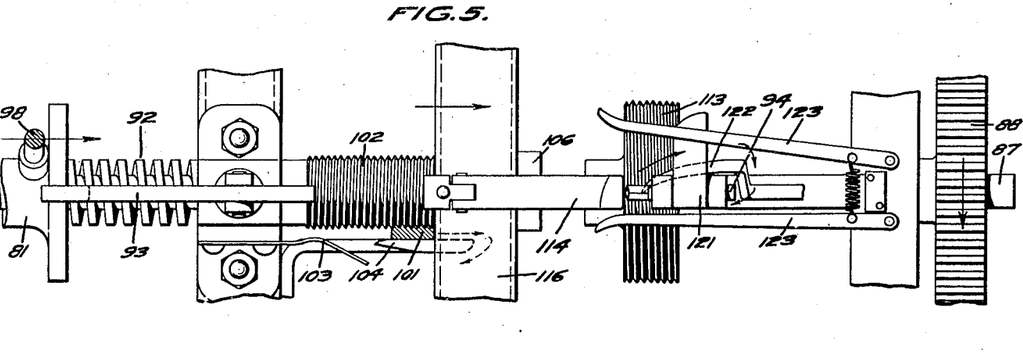
Fig. 5 is a view similar to that of Fig. 4 but showing the elements in a different relation.
Figure 6:
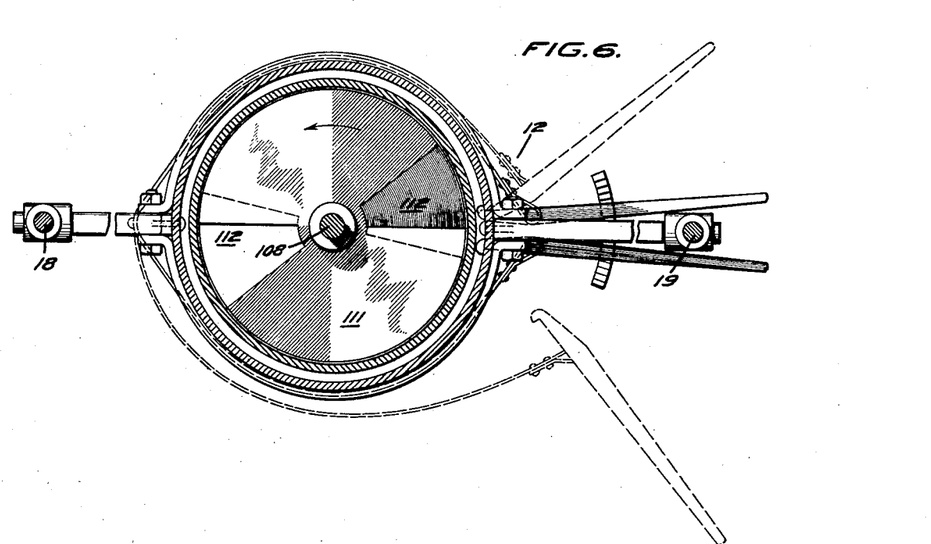
Fig. 6 is a horizontal sectional view taken in the plane indicated by the line 6—6 of Fig. 1.
Figure 7:
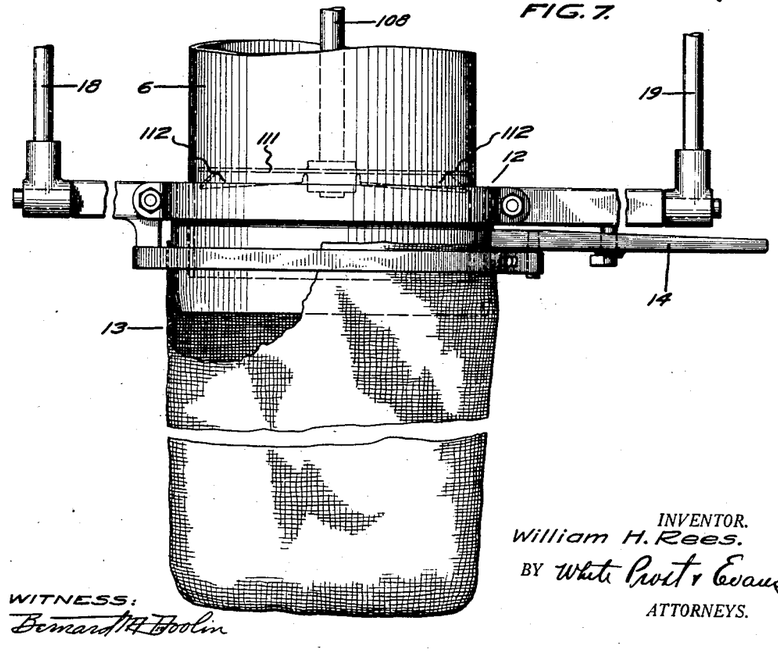
Fig. 7 is a side elevation of the lower end of the hopper and the sack holding devices.

Means are also provided, operated by the rod 94, for rotating the disks 11, to lock the frame 4 upon the frame 7 so that vibration is prevented from passing to the scale mechanism. Fixed on the shaft 87 is a feed screw 113, adapted to be engaged by the feed arm 114, which is pivotally mounted on a cross bar 116 extending transversely across the machine and slidably mounted, as best shown in Fig. 4, on slides 117, arranged on the frame members 7. A rod 118 connects each end of the cross bar 116 with one of the disks 11, and a stud screw 119 provides an adjustable engagement between the feed arm 101 and the cross bar. A spring 120 normally keeps the feed arm 114 free of engagement with the feed screw. Pivotally mounted on the end of the rod 94 is a dog 121, the transverse movement of which is controlled by guide arms 122 and 123, as best shown in Fig. 5. These guide arms are so arranged that when the rod 94 is released by the trigger 97 the dog 121 engages the feed arm 114 and forces it downwardly into engagement with the lead screw 113. At the end of the stroke of the rod 94, the dog 121 has been disengaged from the feed arm 114, by the spring pressed guide arm 123, and on the return stroke of the rod 94, the dog 121 is turned laterally by the guide arm 122 so that it passes around the end of the feed arm to first position. The fixed arm 122 forces the transverse movement of the dog 121 while in engagement with it, and the spring-pressed guide arms 123 move the dog transversely at each end of its stroke after it is freed from the arm 122, so that the dog travels about the fixed arm in the direction of the arrows shown in Figure 5.

*Operation.*—Let us assume that material is being conveyed thru the feed conduit 26 by the feed screw 27 and that the gate is opened, 100 pounds being the desired maximum load to be placed in the sack. As the material passes thru the feed aperture into the hopper the pointer on the scale gradually approaches 98 pounds, at which point the first spark discharge takes place. This results in the energization of the magnet 48 and the partial closing of the gate. The dribble thru the partially opened feed aperture now gradually brings the load to the desired maximum and as the pointer reaches 100 on the scale the second spark discharge occurs resulting in the energization of the magnet 49 and the complete closure of the gate. Under the influence of the spring 44, the gate closes with some force knocking out the trigger 97 and rebounding a small amount, but not enough to open the passage. With the release of the trigger 97, the rod 94 is drawn in the direction of the arrow by the spring 96. The first result of this movement is engagement of the feed arm 114 with the lead screw 113, and the resultant rotation of the disk 11 to lock the frame 4 to the frame 7, allowing the pointer on the scale to return to zero. Immediately following the locking of the frame, the latch 93 is raised by the arm 99, and the clutch member 91 engages the clutch member 89 to cause the rotation of the shaft 15 with the resultant vibration of the sack holder and the rotation of the discharge or packing disk 111. By this time the feed arm 101 has been engaged with the lead screw 102 and has started the return movement of the rod 94. This movement first disengages the clutch members so that rotation of the shaft 15 ceases, the stud 119 on the feed arm 101 also engaging the cross bar 116 and moving it backwardly to release the clamping disks 11. At the conclusion of the return movement effected by the lead screw 102, the parts have again fallen into the first position, and await only the manual opening of the gate to begin a second cycle. Desired adjustment between the correlated parts may be had by varying the position of the split collar 106, the length of the feed arm 104 and the amount of projection of the stud screw 119.

While it is preferred to weigh the material first into a hopper and then discharge it into a sack, especially where vibration is necessary to settle the material, it is of course obvious that certain kinds of material may be passed thru the gate directly into the sack. In this case the vibrating and packing devices may be omitted.

I claim:

1. A weighing and loading machine comprising a receptacle, means for feeding material to said receptacle, means for weighing the material in said receptacle, and mechanism including control means spaced from the weighing means and responsive to the weight of the material in the receptacle for interrupting all but a dribble flow of material when less than the predetermined load has been fed into said receptacle, and for interrupting the dribble when substantially the predetermined load is in said receptacle.

2. A weighing and loading machine comprising a receptacle, means for feeding material to said receptacle, and mechanism including control means spaced from the weighing mechanism of the machine and operated by the weight of material in said receptacle for first interrupting the flow of part of said material to said receptacle and then interrupting the flow of all of said material to said receptacle.

3. A weighing and loading machine comprising a receptacle, means for feeding material to said receptacle, and mechanism including control means spaced from the weighing mechanism of the machine and operated by a predetermined weight of material in said receptacle for interrupting the flow of part of said material to said receptacle, and operated by a second and larger predetermined weight of material in said receptacle for interrupting the flow of all of said material to said receptacle.

4. A weighing machine having an element movable in accordance with the load in the machine, a relatively fixed element, means for loading the machine, means for determining the weight of the load operative by the production of a spark discharge between said elements, and means for producing said spark discharge.

5. A weighing machine having an element movable in accordance with the load in the machine, a pair of fixed elements whose positions correspond respectively to a predetermined maximum load and a predetermined load less than the maximum, means for loading the machine, means operative by the production of successive spark discharges between said movable element and said fixed elements for interrupting the loading of the machine when the said maximum is reached and means for producing said spark discharges.

6. A weighing machine comprising a feed conduit, a hopper, a gate for controlling the discharge of material from said conduit into said hopper, an electrode movable in accordance with the load in said hopper, a pair of fixed electrodes, means characterized by the production of successive spark discharges between the movable and fixed electrodes for first partially and then completely closing the gate, and means for producing said spark discharges.

7. A weighing machine comprising a feed conduit, a hopper, a gate for controlling the discharge of material from said conduit into said hopper, electromagnetic means for controlling the operation of said gate, and means spaced from the weighing mechanism of the machine and operated by the weight of material in said hopper for controlling the operation of said electromagnetic means.

8. A weighing machine comprising a feed conduit, a hopper, a gate for controlling the discharge of material from said conduit into said hopper, means for holding a receptacle under said hopper, means spaced from the weighing mechanism of the machine for shutting the gate when a predetermined load of material has entered the hopper, and means the operation of which is initiated by the closing of the gate for discharging the material from the hopper into the receptacle.

9. A weighing machine comprising a feed conduit, a hopper, a gate for controlling the discharge of material from said conduit into said hopper, means for holding a receptacle under said hopper, means for shutting the gate when a predetermined load of material has entered the hopper, and means the operation of which is initiated by the closing of the gate for discharging the material from the hopper into the receptacle and for vibrating the receptacle holding means.

10. A weighing machine comprising a feed conduit, a hopper, a gate for controlling the discharge of material from said conduit into said hopper, means for holding a receptacle on said hopper, means for shutting the gate when a predetermined load of material has entered the hopper, a shaft, means for discharging the material from said hopper into said receptacle actuated by said shaft, a drive shaft, and means activated by the closing of the gate for connecting said shafts.

11. A weighing machine comprising a feed conduit, a hopper, a gate for controlling the discharge of material from said conduit into said hopper, means for holding a receptacle under said hopper, means for shutting the gate when a predetermined load of material has entered the hopper, a shaft, means for discharging the material from said hopper into said receptacle actuated by said shaft, a drive shaft, means activated by the closing of the gate for connecting said shafts and after a predetermined period disconnecting them.

12. A weighing machine comprising a feed conduit, a hopper, a gate for controlling the discharge of material from said conduit into said hopper, means for holding a receptacle under said hopper, means for shutting the gate when a predetermined load of material has entered the hopper, a shaft, means for discharging the material from said hopper into said receptacle actuated by said shaft, a drive shaft, clutch members on said shafts, a lead screw on said drive shaft, a spring-pressed rod controlling the engagement of the clutch members, a dog on said rod engageable with said lead screw, means actuated by the closing of the gate for releasing said rod and for effecting the engagement of the clutch members, and means for engaging the dog with the lead screw to disengage the clutch members.

13. In combination with a weighing scale, a feed conduit, a hopper supported on said scale, a gate for controlling the discharge of material from said conduit into said hopper, means for holding a receptacle under said hopper, means for shutting the gate when a predetermined load of material has entered the hopper, and means activated by the closing of the gate for vibrating the receptacle holding means and for discharging the material from the hopper to the receptacle and for preventing the transmission of vibration from the receptacle holding means to the scale.

14. In a weighing machine, a gate, a pair of latches for holding the gate respectively in open and partly open position, an electromagnet for releasing each latch, and means spaced from the weighing mechanism of the machine and activated by predetermined weights of material which has passed the gate for successively energizing the electromagnets.

15. In a weighing machine, a gate, a pair of latches for holding the gate respectively in open and partly open position, an electromagnet for releasing each latch, means spaced from the weighing mechanism of the machine and activated by predetermined weights of material which has passed the gate for successively energizing the electromagnets, and means operative by the movement of the gate for opening the energizing circuits.

16. In a weighing machine, a gate, a pair of latches for holding the gate respectively in open and partly open position, an electromagnet for releasing each latch, means spaced from the weighing mechanism of the machine and activated by predetermined weights of material which has passed the gate for successively energizing the electromagnets, means operative by the movement of the gate for opening the energizing circuits, and manually operated means for opening said gate.

17. In a weighing machine, a gate, a pair of latches for holding the gate respectively in open and partly open position, a circuit for each latch and including a translating device for releasing the latch, a switch in each circuit, a circuit including a translating device for operating each switch, means for producing a current flow in each of said second named circuits, a circuit inductively coupled to each of said second named circuits, an electrode in each of said third named circuits fixed in positions corresponding to the total load to pass the gate and to less than said total load, and an electrode in the third named circuits movable in accordance with the weight of material which has passed the gate, whereby the production of a spark between the movable and the first fixed electrodes effects the partial closing of the gate and the production of a spark between the movable and the second fixed electrodes effects the complete closure of the gate.

18. A weighing and loading machine comprising a receptacle, means for feeding material to said receptacle, and mechanism operated by a predetermined weight of material in said receptacle for interrupting the flow of part of said material to said receptacle, and operated by a second and larger predetermined weight of material in said receptacle for interrupting the flow of all of said material to said receptacle; said mechanism including a control circuit having a permanent gap therein.

In testimony whereof, I have hereunto set my hand.

WILLIAM H. REES.